(No Model.)
J. H. McCOY.
APPARATUS FOR TREATING ORES.
No. 577,825.
4 Sheets—Sheet 3.
Patented Feb. 23, 1897.
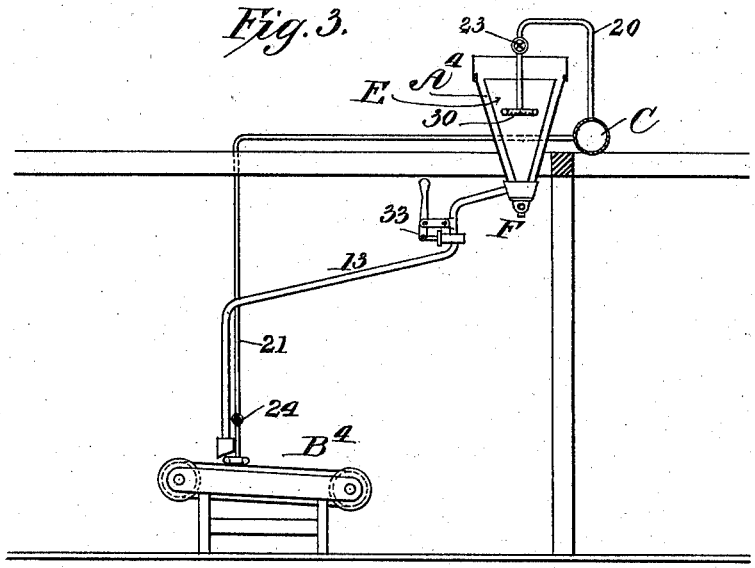
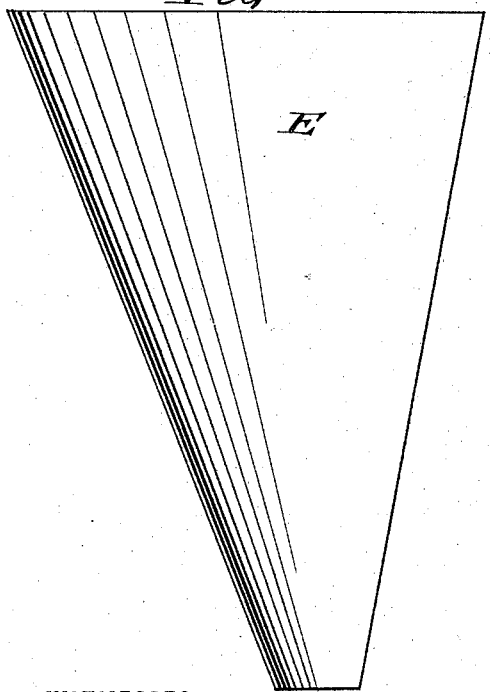
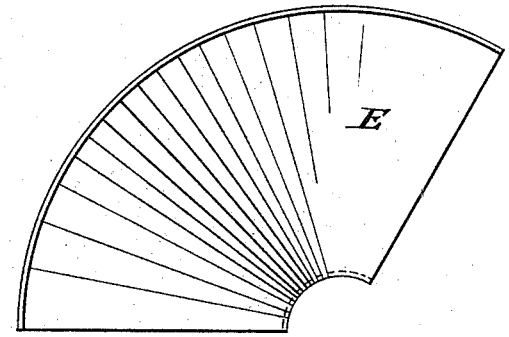
WITNESSES:
INVENTOR,
John H. McCoy
BY
Henry F. Parker
ATTORNEY.

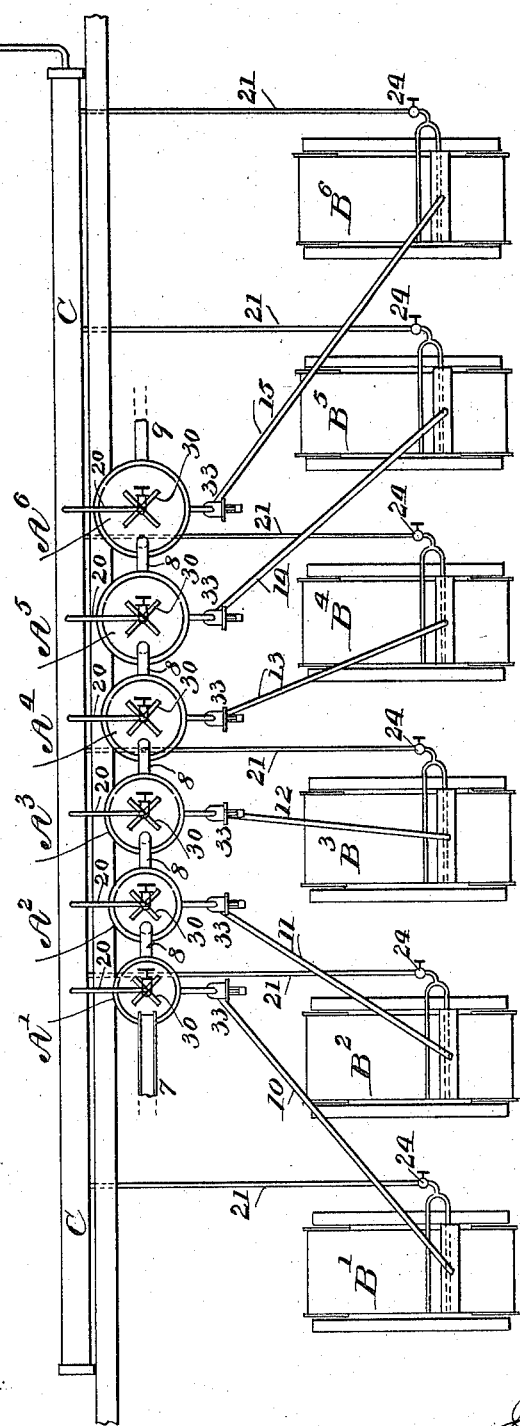

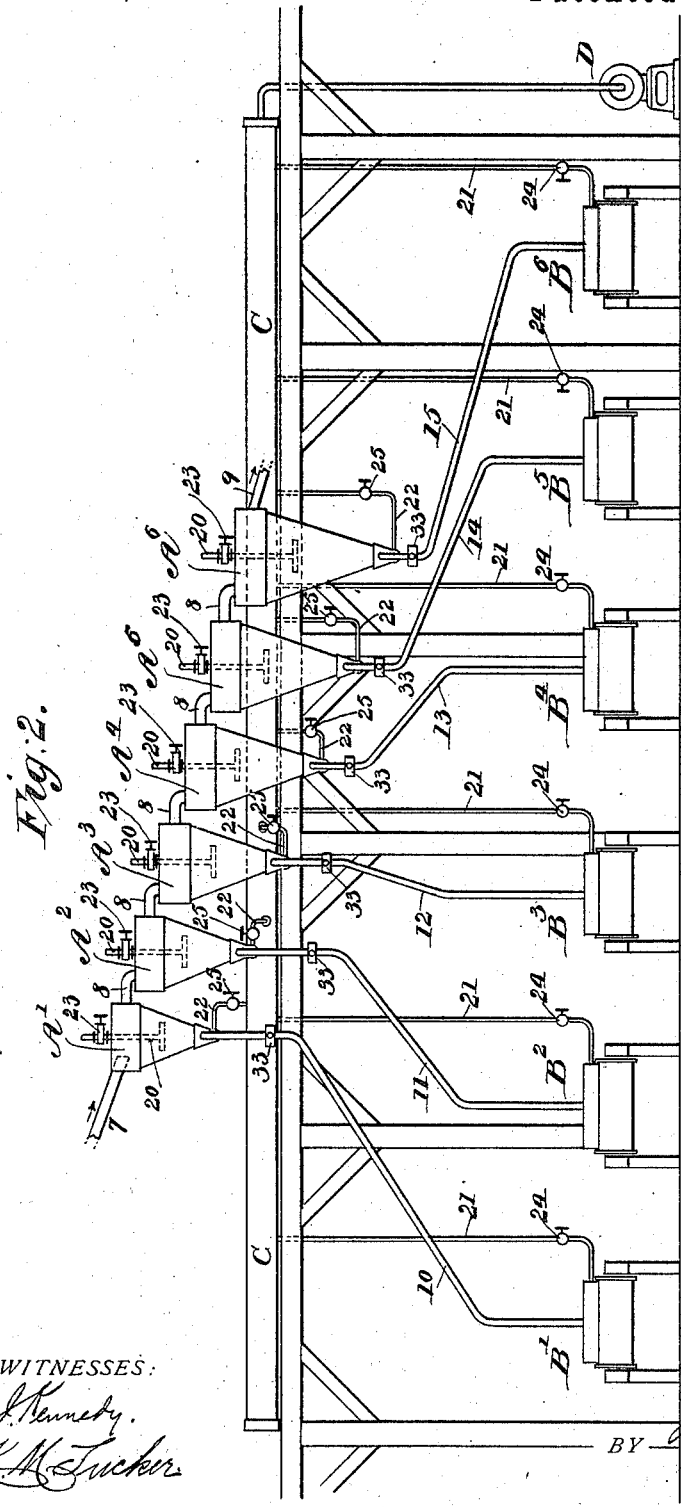

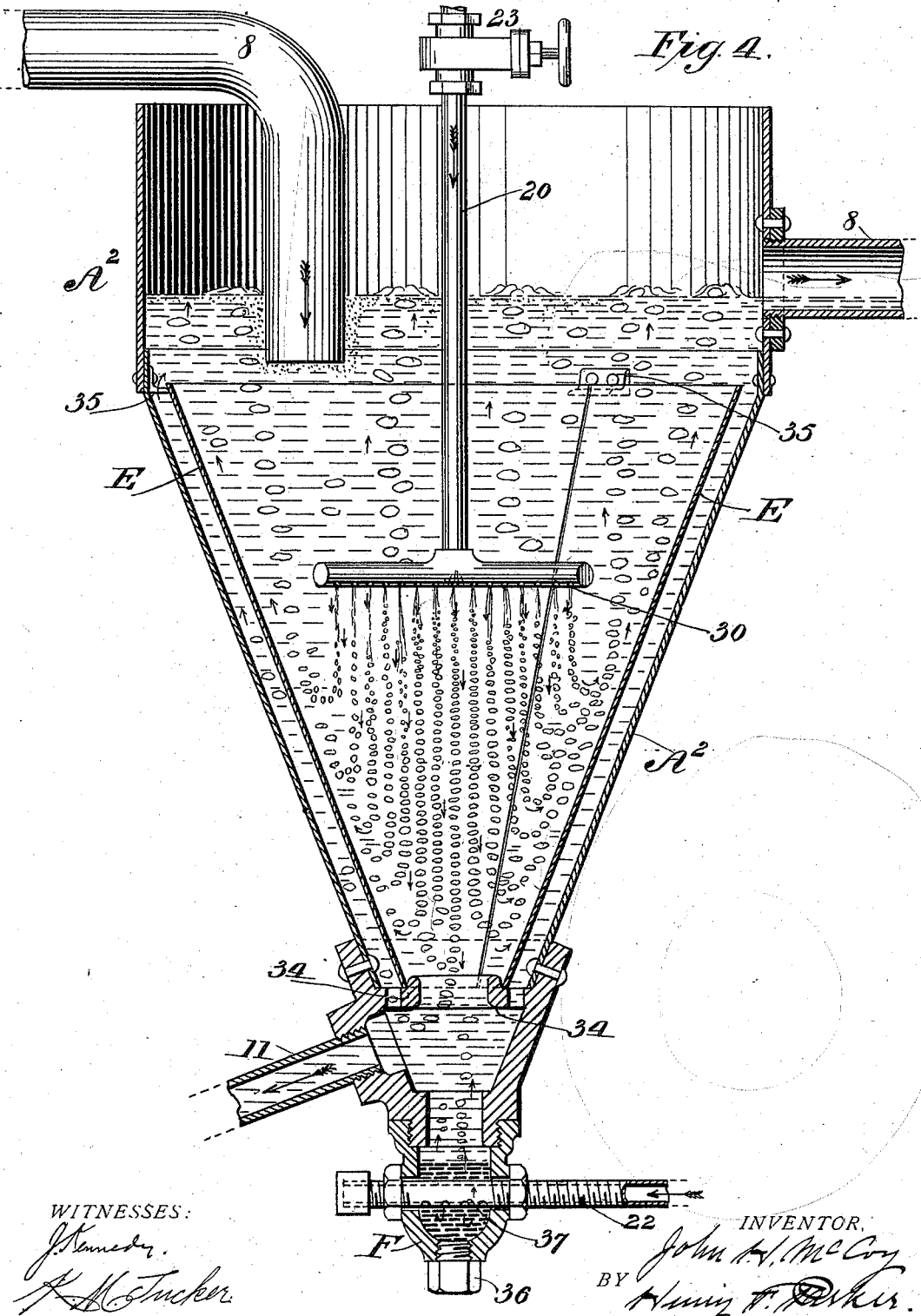

UNITED STATES PATENT OFFICE.

JOHN HENRY McCOY, OF OURAY, COLORADO.

APPARATUS FOR TREATING ORES.

SPECIFICATION forming part of Letters Patent No. 577,825, dated February 23, 1897.

Application filed February 11, 1895. Serial No. 537,964. (No model.)

*To all whom it may concern:*

Be it known that I, JOHN HENRY McCOY, a citizen of the United States, and a resident of Ouray, in the county of Ouray and State of Colorado, have invented certain new and useful Improvements in Apparatus for the Treatment of Ores, of which the following is a specification.

My invention relates to a method of and apparatus for the separation of the fine metalliferous particles from mill-tailings; and the object of said invention is to obviate the necessity of using sizing-screens, and also to completely separate and save all the valuable metalliferous particles which are of such fineness as have hitherto escaped with the slime and gone to waste by reason of the tendency of very finely-pulverized metals to float and defeat perfect hydraulic separation by specific gravity in the graders and by reason of incomplete amalgamation in the battery; and the object of my invention is also to perform the grading by specific gravity without diluting the pulp by introduction of surplus water in the graders, which is detrimental to subsequent perfect concentration on the vanners or percussion-tables.

The object is also to amalgamate gold particles perfectly and without interruption in the operation of the mill.

My invention consists in certain novel apparatus for performing complete and perfect separation and amalgamation, as above indicated, and in order to enable others skilled in the art to which my invention appertains to understand and use the same I will proceed to describe the details of its construction, explain its operation, and subsequently point out in the appended claims its novel characteristics.

My invention further embodies a novel process for accomplishing the release of the infinitesimal fines, slimes, or the like ordinarily retained by the scum which accumulates upon the surface of the pulp, which process consists, essentially, in the downward projection of an air-blast into the pulp and in concentrating the blast by the convergence of the receptacle, or by other means, to produce a positive downward current through the pulp sufficient in force to release the fines from the scum and precipitate them to the bottom of the receptacle.

Referring to the accompanying drawings, in which similar characters of reference indicate corresponding parts throughout the several views, Figure 1 is a plan view illustrating the general arrangement of apparatus embodying my invention in a plant for treating mill-tailings. Fig. 2 is a front elevation of Fig. 1, and Fig. 3 a sectional end elevation thereof. Fig. 4 is an enlarged vertical sectional elevation of one of the series of graders, also showing amalgamating-plates therein. Fig. 5 is a side view, and Fig. 6 a plan view, of one of the removable amalgamating-plates used in the graders.

Referring to the general views, Figs. 1, 2, and 3, $A'$ $A^2$ $A^3$ $A^4$ $A^5$ $A^6$ represent a series of ore-graders, to the first one, $A'$, of which the pulp from the stamp-battery is conveyed directly, without intervening screen, by the conduit 7. The pipes 8 carry the tailings of each grader to the next, until finally the slime is discharged at 9. The headings of each grader are carried by pipes 10 11 12 13 14 15 to respective vanners $B'$ $B^2$ $B^3$ $B^4$ $B^5$ $B^6$ for final concentration of headings.

C represents a compressed-air reservoir supplied by a compressor D, and from this reservoir air-pipes 20 supply the graders, and air-pipes 21 supply the vanners, operating on a similar principle to that set forth in my Letters Patent of the United States No. 501,022, granted July 4, 1893.

The vanners herein indicated are of the Frue type; but it is of course understood that my present invention is adapted for use in connection with any other well-known or suitable vanners or percussion-tables.

The air-pipes 22 enter the bases of the graders for purposes which will hereinafter appear.

Each of the various air-pipes 20 21 22 is independently regulated by respective cocks 23 24 25. The several air-pipes 20 terminate at a point about intermediate to the depth of each grader, with a perforated head 30 of suitable shape having numerous small perforations directed downwardly, so as to project jets of compressed air forcibly to or near the bottom of the grader, and the force of these jets is regulated by the valve 23.

The location of the upper end of each pipe 8 determines the level of the pulp in the boxes, and the lower end of each pipe 8 is carried a few inches below the level of the pulp, Fig. 4.

At the base of the grader the pipe 11, &c., leading to a vanner, is located and suitably regulated by the valve 33, Fig. 3.

The grader is so converged toward its base that the injected air, after being forced downward from the head 30, shall be laterally distributed in rising.

When gold is present, I add to the grader the removable amalgamating-plates E, of copper, (shown separately in Figs. 5 and 6,) which plates may be conveniently constructed in three sections of the form indicated, which are inserted and supported on the bridge 34 and lugs 35 in the grader at a slight distance from the wall thereof. The mercury is applied to both sides of the plates E, and as the same becomes worked off it descends into the trap F and is entirely saved, being removed from time to time by unscrewing the plug 36. Air-jets projected downwardly from perforations 37 in the pipe 22 throw out by their rising action all foreign particles from the mercury, which particles are driven upward and kept with the pulp.

The operation of my invention is as follows: The mill-tailings entering at 7 the pulp is deposited in the first grader A'. The heavier of the metalliferous particles will at once settle, overcoming the counterforce of the rising air-bubbles from the pipe 20, and pass to the base of the box and out through the pipe 10 to the vanner B', whereon the final concentration is performed. Such metalliferous particles as are so fine as to float will be worked under the surface of the pulp in each grader by the turbulent action of the liberated air-bubbles, and also pass down, subject to specific gravity. The force of the air-jets at 30 is graduated in each grader by the valves 23, so that with greatest force at A' the turbulence diminishes in the order of the succeeding graders $A^2$ $A^3$ $A^4$ $A^5$ $A^6$, and, moreover, the increase in size of the respective boxes, as indicated in Figs. 1 and 2, contributes to the same purpose. All the particles, except those of greatest specific gravity, are therefore thrown up by the universally-distributed bubbles in box A', and these pass over into box $A^2$ by pipe 8, where a less force of air in a greater volume of pulp serves to sink the next grade of heavy particles, raising the remainder to flow through the next lower pipe 8 into the succeeding grader, and so on throughout the series, until finally the slime is discharged at 9 from the grader $A^6$. The valuable particles of predominating specific gravity flow with regulated current of pulp from each succeeding grader through pipes 11 12 13 14 15, controlled by valves 33, supplying the vanners $B^2$ $B^3$ $B^4$ $B^5$ $B^6$ with classified concentrates.

The air-jet at 30 may be altogether omitted in the last box $A^6$, if desired, the delivery-pipe 15 being so regulated in proportion to the amount of pulp received at the inlet-pipe 8 of the box $A^6$ that the proper overflow shall exist at 9.

No current of water is injected at the base of any of the graders, as heretofore commonly practiced, and the buoyancy of the air is wholly relied on, although a water countercurrent may of course be coöperatively employed, if desired. It is of advantage to treat the pulp without dilution after leaving the battery, because of reduced waste of valuable material by surplus wash on the vanners or percussion-tables.

The downward current from the perforated head 30 is practically confined to the center of the box, and the air is spread when rising against the same, so as to follow the upwardly-diverging sides of the box and diffuse throughout the body of pulp.

The inlet ends of the pipes 8 are preferably immersed below the surface, as in Fig. 4, for the purpose of forcing the submersion of the fine metalliferous particles, the most of which will, however, rise to the surface and be afterward thrown down by the action of the air. There is an intimate intermixing of the chemical constituents of the air and water within the box upon the pulp contained therein in the manner herein described, which results in a marked increase of efficiency of this process of treating ores.

When gold is present, the amalgamated plates E are inserted, dispensing with use of plates and delay of cleaning the same in the battery, and the gold particles are repeatedly circulated against the surface of said plates E by the action of the air-bubbles, and in each grader are arrested and obtained by the removal of the plates as frequently as required without interrupting the operation of the apparatus.

Having thus fully described my invention, what I claim, and desire to secure by Letters Patent, is—

1. The herein-described method of liberating fines, slimes and the like from pulp which consists in projecting an air-blast downwardly through the pulp from a point below the scum formed upon its surface, concentrating the air-blast to produce a positive downward current tending to draw the fines through the scum, and finally permitting the diffusion of the air as it rises for the purpose of inducing a circulation or ebullition within the pulp.

2. In an apparatus designed for use in the treatment of ores, the combination with a receptacle substantially V-shaped in vertical cross-section and provided with an outlet, of means for projecting an air-blast in a downward and substantially vertical direction from a point within the receptacle, and means for supplying pulp to said receptacle.

3. The combination with a receptacle having substantially parallel walls and converging continuations thereof substantially V-shaped in vertical cross-section, of an outlet located at or near the lower end of the receptacle, means for supplying pulp to said receptacle, and means for projecting an air-blast in a downward and substantially vertical direction from a point within the receptacle, and intermediate of its converging walls.

4. The combination with a receptacle substantially V-shaped in vertical cross-section, and an outlet adjacent to its lower end, of an air-pipe extending downwardly into the receptacle in a substantially vertical direction and having a head upon its extremity provided with numerous perforations in its under side.

5. The combination with a receptacle provided with outlets adjacent to its opposite ends and substantially V-shaped in vertical cross-section, of means for supplying pulp to the receptacle, and an air-pipe extending downwardly into the receptacle in a substantially vertical direction to a point substantially midway between the outlets.

6. The combination with a receptacle substantially V-shaped in vertical cross-section, and an outlet at its lower end of a pulp-supply pipe discharging downwardly into the receptacle, and an air-pipe extending downwardly in a substantially vertical direction designed to project a blast downwardly from a point below the pulp-supply pipe.

7. A box having converging sides, an amalgamated plate therein supported at a distance from the sides of said box, and parallel therewith, a submerged air-discharge by means of which the air is forced within and below said plate and permitting it to rise upon both sides of the same.

8. The combination with an ore-pulp-grading box converging from the top toward the bottom, of an air-inlet submerged in the pulp, having its opening intermediate to the depth of the box, and directed downward centrally toward the converged portion of the box, adapted to operate as described.

9. The combination with an ore-pulp-grading box, of amalgamating-plates within the box, a mercury-trap below the plates, and an air-inlet in the trap adapted to agitate the mercury therein and throw out foreign substances into the pulp above the mercury.

10. The combination in an ore-pulp-grading box converging from the top toward the bottom, of a pulp-inlet at or near the top of the box, an outlet for lighter constituents also at or near the top of the box, amalgamating-plates converging from the top toward the bottom and near the sides of the body of the box, a compressed-air inlet between the converging sides of the said plates, an outlet for the heavier constituents at or near the bottom of the box, and a mercury-trap below the latter outlet and under said plates.

11. The combination in an ore-pulp-grading box converging from the top toward the bottom, of a pulp-inlet at or near the top of the box, an outlet for lighter constituents also at or near the top of the box, amalgamating-plates converging from the top toward the bottom and near the sides of the box, an outlet for the heavier constituents at or near the bottom of the box, and a compressed-air inlet between the converging sides of the said plates adapted to project the air downward toward the latter outlet and then permitting the air to rise gradually around the sides of the jet between it and said plates.

Signed at New York city, in the county of New York and State of New York, this 31st day of January, A. D. 1895.

JOHN HENRY McCOY.

Witnesses:
HENRY F. PARKER,
K. M. TUCKER.